Aug. 12, 1941.                H. T. GRAY                2,252,073
                              BULB PROTECTOR
                           Filed March 16, 1939
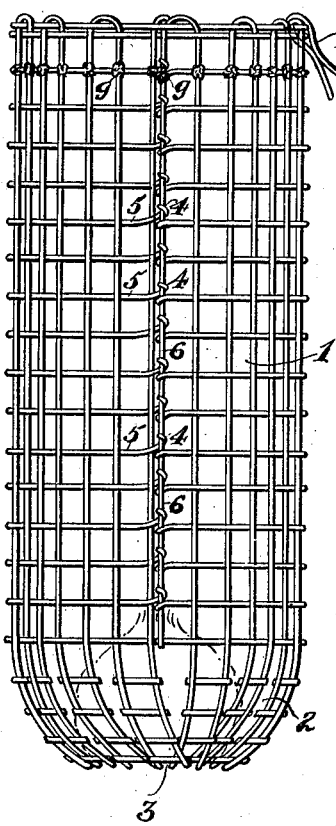
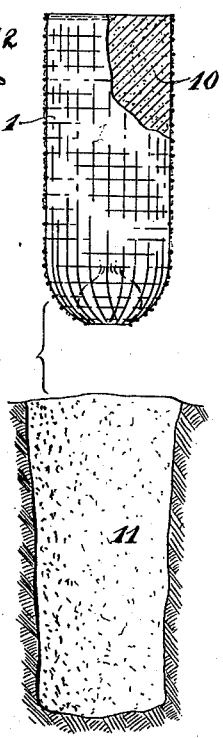
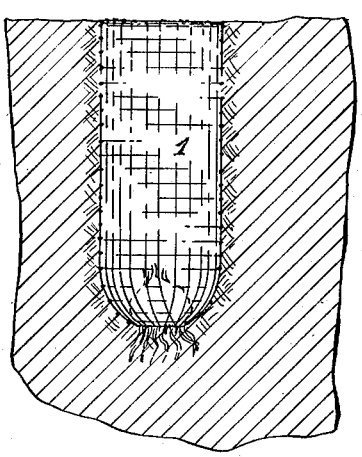
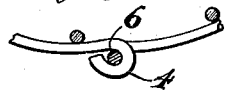
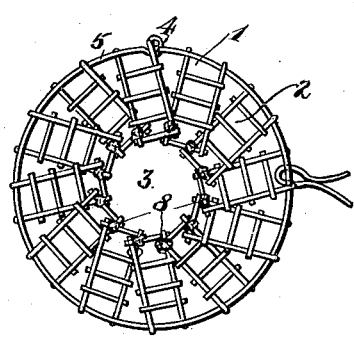
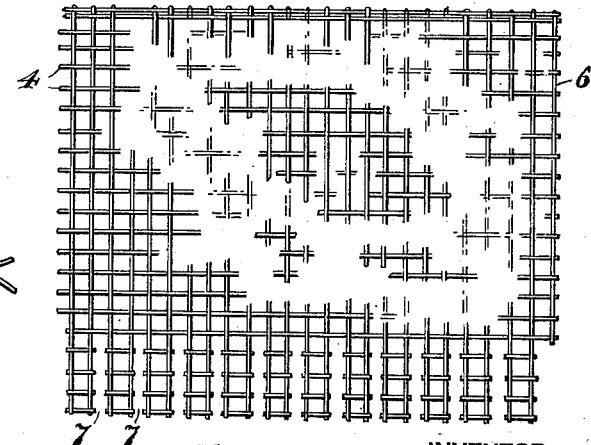
INVENTOR,
Harriet Tyng Gray.
BY
Andrew Wilson,
ATTORNEY.

Patented Aug. 12, 1941

2,252,073

UNITED STATES PATENT OFFICE 2,252,073

BULB PROTECTOR

Harriet Tyng Gray, Greenwich, Conn.

Application March 16, 1939, Serial No. 262,122

1 Claim. (Cl. 47—37)

My invention relates to means for protecting flower bulbs, and the like, when planted in the ground, from injury by underground vermin, such as mice, which will gnaw and damage the bulbs.

Objects of my improvements are to provide a protector which will not interfere with the normal growth of the bulb, but will freely admit air and moisture, and will allow the roots of the bulb to extend, without material interference, out into the soil surrounding the protector; to allow the growth of the shoots from the bulb upward without obstruction other than the soil in which the bulb is planted; to provide means for marking the proper depth of the bulb; to so form the protector that it may be pressed downward into position in the soil without distortion; to provide means for readily positioning the bulb in the protector before planting in the ground; to provide a protector which may be readily raised out of the soil, with the bulb in it; to provide a protector that will serve as a container for the bulb during its dormant season; to provide means for avoiding air pockets; to provide means for readily identifying the particular bulb within the protector, both before and after planting; and to secure the other advantages hereinafter pointed out and claimed.

In the drawing, Fig. 1 is an elevation of a protector illustrating my improvements; Fig. 2 is a bottom view of the same; Fig. 3 is a view on a reduced scale of a section of wire netting cut to form up into a protector, medial portions being excised; Fig. 4 is an edge view of the same looking down; Fig. 5 is a detail, on an enlarged scale, showing the way in which the edges of the protector are joined; Fig. 6 shows, on a reduced scale and partially broken away, a protector with a bulb, in broken lines, therein and filled with soil; and also a hole in the ground to receive the protector; and Fig. 7 shows the protector of Fig. 6 in place in the hole; medial portions of Figs. 6 and 7 are excised.

Similar reference numerals designate similar parts in all the figures.

The protector is designated as a whole by the reference numeral 1, and is shown as made of wire mesh, for instance of approximately one quarter inch openings, in the form of a hollow cylinder having an open top and a semi-spheroidal bottom 2, with an open center 3 therein. This cylinder may be conveniently formed from a flat section of netting such as shown in Fig. 3, by bending the lateral edges around until they meet and hooking and closing the ends 4, 4 of transverse wires 5, 5 around a vertical wire, 6. To avoid too extensive overlapping of the bottom portions when bent inward, I cut alternate slots 7, 7 upwards from the bottom of the wire to the point where the bottom begins to curve in, which is marked by the first continuous transverse wire 5, and then bend the sections inward, successively, so that the corners of each section overlap or are overlapped by corners of the adjacent sections, as illustrated in Fig. 2; and I secure the overlapping corners of the sections to each other, as by spots of solder 8, 8, so as to hold the elements of the bottom in proper relative relations. The junctions of the other wires of the protector may advantageously be soldered to each other, as at 9, 9, to increase the rigidity of the protector. In practice I find that this may be satisfactorily accomplished by dipping the formed protector in solder, which will effectually join the wires to each other.

It is to be understood that the wires of the protector are made of metal which will effectually resist corrosion from the moisture of the soil; so that the protector will be usable repeatedly without material deterioration of its wires.

The inwardly converging form of the bottom causes a bulb to automatically center itself in the bottom, while the opening 3 in the base of the protector permits the ready insertion of a finger or a tool to move the bulb around so as to bring its base in proper position above the opening 3 through which the roots, as they develop, may freely pass into the adjacent soil. Both this opening 3 and the meshes of the protector are sufficiently small to prevent ground rodents from passing through them.

The length of the protector preferably corresponds with the depth at which the particular bulb for which it is intended should be planted. Different varieties of bulbs should be planted at different depths; and the protectors may be made of such various lengths and diameters as will suit the particular bulbs planted within them.

If the protector should be used for a bulb which should not be planted as deep as the length of the protector the proper depth may be registered on the protector by counting meshes from the top downward to the particular depth desired, and then attaching a telltale to the protector at that depth; so that the telltale may designate the correct depth as well as identifying the particular bulb within it, as hereinafter pointed out.

In practice I prefer to first place a bulb in the bottom of an appropriately sized protector and then fill the protector with soil 10, well pressed down, so that it exudes slightly through the meshes of the protector, care being taken to keep the bulb properly positioned while the soil is being pressed above it. This prevents the formation of air pockets above the bulb. A hole, as 11, is made in the ground approximately the size of the protector; and the filled protector is then pressed down into the hole until the top of the protector is level with the surface of the ground. In this process the wires of the protector will rub off more or less of the surrounding soil, which will fall into the bottom of the hole, particularly in the angle between the sides and the bottom, so as to tend to form a concave bottom in the hole for the convex end of the protector to bed down in. And when the protector is firmly pressed down into place its bottom will make close contact with the subjacent soil, effectually eliminating air pockets below the bulb.

When the proper time arrives for taking up the bulb, the top of the protector may be engaged by the fingers, or by a suitable, hooked tool, and the protector pulled up, bringing the bulb with it. The soil may then be shaken out of the protector, and the bulb left in it, if desired, during its dormant season.

To identify the particular bulb planted in the protector it is desirable to have a durable telltale or designator so associated with the protector as to positively but inconspicuously show the character of the bulb. For this purpose I use a metal clip 12, which may be sprung over the top wire or wires of the protector, as shown in Fig. 1, and will remain there until intentionally disengaged. Each mesh of the protector makes a predetermined designation for a bulb. For instance the protector illustrated has twenty-four spaces or meshes in its circumference; and these spaces may be counted successively from a fixed starting point, for instance the seam where the edges of the protector are joined. Thus in Fig. 1 the telltale 12 is placed in the sixth space to the right of the seam of the container. The gardener may associate this sixth space with the name of a particular bulb; so that on observing the position of the telltale, he can at once determine the particular variety of bulb which it contains. This is of marked assistance in the proper care and preservation of the bulb, both while in the ground and while held in the protector for replanting. Thus two dozen different varieties of bulbs may be planted one each in similar protectors of the particular pattern shown, and their several characters readily determined by the circumferential positions of the respective telltales.

By means of my improvements I am able to produce a bulb protector which can be produced at low cost, is strong and capable of long and repeated use, protects the bulb from ground rodents, allows the bulb's roots to spread freely into the adjacent soil, facilitates the centering and positioning of the bulb therein, furnishes a guide for approved depths of planting, minimizes air pockets, readily identifies the particular bulb within it, constitutes a convenient, marked receptacle for the storage of the dormant bulb, and has other advantages incidental to its structure and use.

The form of construction illustrated and explained is to be understood as a typical but not an exclusive form of suitable embodiment of my invention; for details may be varied, as by the use of equivalents, without departing from the spirit of my invention or the scope of my claim.

What I claim and desire to secure by Letters Patent of the United States is:

A bulb protector embodying an elongated, laterally closed body with an inwardly and downwardly converging bottom all provided with a multiplicity of openings therethrough sufficiently small to exclude ground mice but large enough to afford free egress to the roots of a contained bulb.

HARRIET TYNG GRAY.